United States Patent [19]

Gee et al.

[11] Patent Number: 5,058,565
[45] Date of Patent: Oct. 22, 1991

[54] SOLAR CONCENTRATOR DEVICE AND SUPPORT STRUCTURE THEREFOR

[75] Inventors: Randy C. Gee, Golden; Edmund K. May, Lakewood, both of Colo.

[73] Assignee: Industrial Solar Technology

[21] Appl. No.: 274,990

[22] Filed: Nov. 22, 1988

[51] Int. Cl.⁵ ............................................. F24J 2/10
[52] U.S. Cl. ............................ 126/438; 126/424; 126/450; 359/867; 359/872
[58] Field of Search ..................... 126/424, 425, 438; 350/625, 626, 628, 632; 52/601, 602, 289

[56] References Cited

U.S. PATENT DOCUMENTS

| | | | |
|---|---|---|---|
| 4,000,734 | 1/1977 | Matlock et al. | 126/438 |
| 4,114,594 | 9/1978 | Meyer | 126/424 |
| 4,372,027 | 2/1983 | Hutchison | 126/438 |
| 4,423,719 | 1/1984 | Hutchison | 126/438 |
| 4,611,575 | 9/1986 | Powell | 126/438 |

FOREIGN PATENT DOCUMENTS 625876 10/1981 Switzerland .

Primary Examiner—James C. Yeung
Attorney, Agent, or Firm—John L. Isaac

[57] ABSTRACT

A solar concentrator device is disclosed. The device includes a solar concentrating panel having a longitudinal axis and defining a parabolic surface having a focal line substantially parallel to its longitudinal axis. The parabolic surface terminates in opposed longitudinal side edges. A mechanism is provided for rotating the panel about its longitudinal axis. Finally, an arrangement provides torsional support for the panel and includes a frame structure aligned obliquely to the longitudinal axis and extending between the opposed longitudinal side edges of the parabolic surface.

24 Claims, 5 Drawing Sheets

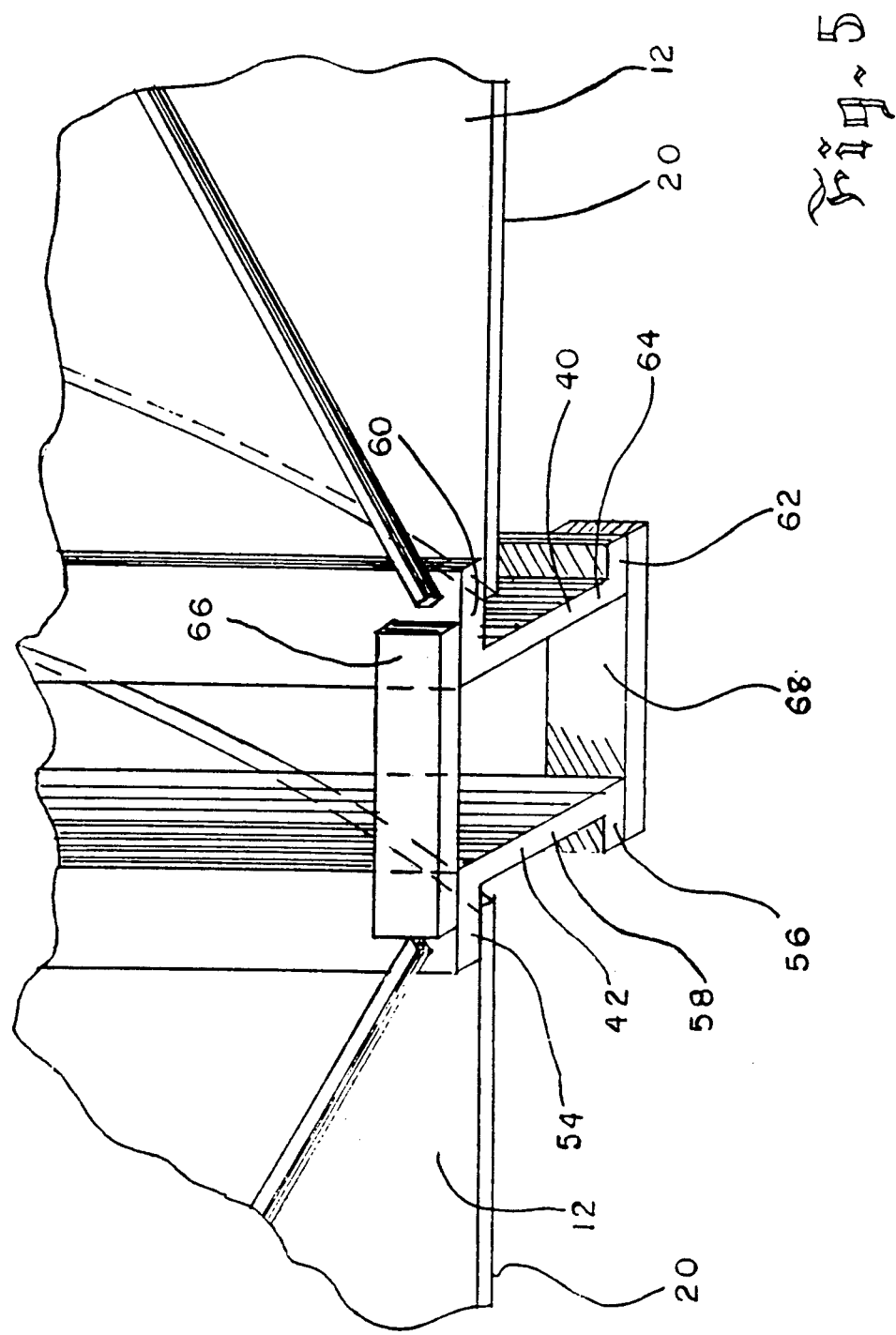

SOLAR CONCENTRATOR DEVICE AND SUPPORT STRUCTURE THEREFOR

BACKGROUND OF THE INVENTION

1. Field of the Invention

The present invention relates generally to solar energy collection devices and, more particularly, to parabolic trough-type reflecting concentrators. Specifically, the present invention relates to structural support mechanisms for parabolic solar energy concentrating devices.

2. Description of the Prior Art

For many years, solar energy devices have used reflecting surfaces to collect and concentrate energy from the sun for conveyance to energy conversion devices of various types. Such concentrators have taken numerous different forms over the years, such as dishes, troughs, and the like. One of the more common arrangements for concentrating sunlight, and in particular on a large scale, is by the utilization of an elongated reflective trough having a parabolic cross-section that reflects incoming sun light or solar energy to a focal line positioned along the length of the parabolic reflector. To maintain a sharp focus of concentrated sun light, such parabolic trough concentrators generally rotate about a single fixed, longitudinal axis to follow the apparent motion of the sun. Parabolic trough concentrators generally rotate about an axis extending parallel to the focal line. Conventionally, the ends of each solar concentrator are generally journalled by bearings that support the concentrator and allow the concentrator to rotate. To correctly position the concentrator device, a mechanical drive system is typically utilized, and to reduce the number of drive systems that are required for a large solar concentrator installation, several parabolic trough concentrators are commonly axially connected together in a row and are rotated using one shared drive system. Examples of such parabolic reflector devices in solar energy collection systems are illustrated in U.S. Pat. Nos. 3,915,147, 4,114,594, 4,178,913 and 4,284,063. All of these patents illustrate rotating solar collection and concentration devices of the parabolic trough-type discussed above.

When several concentrators are connected together in a row, high winds may produce large torsional forces in the parabolic trough concentrators which are extenuated due to the length of the array. Unless the row of interconnected concentrators has sufficient torsional stiffness, twisting along the longitudinal axis of the concentrators can degrade their optical performance and can permanently deform them. Moreover, such twisting can produce undue stress and strain on the bearing connections between the aligned concentrator devices. Thus, to prevent excessive twisting or damage to the concentrators, they are preferably designed to possess high torsional stiffness and support.

Prior devices have generally utilized two different approaches to provide high torsional stiffness to parabolic trough concentrators. In one such approach, the solar concentrator device is stiffened by the actual construction arrangement of the trough reflector itself. U.S. Pat. No. 3,841,738 discloses one such device wherein a parabolic reflector is formed utilizing an expanded honeycomb core which separates sheets of skin material that adhere to the top and bottom surfaces of the honeycomb core, thereby increasing the thickness and torsional stiffness of the reflector device. U.S. Pat. No. 4,240,406 illustrates another parabolic reflector that is formed by utilizing rigid bulkhead members with spaced sheet metal skins which are affixed to the top and bottom surfaces of the rigid bulkhead members, the bulkhead members being aligned perpendicularly to the focal line and rotational axis of the device. Problems associated with solar concentrators constructed from these type of arrangements is that such construction provides substantially additional weight and cost of the materials which are utilized to increase thickness of the parabolic reflector.

Another common method for providing torsional stiffness to solar concentrator devices is by securing a stiff metal tube or rod or other elongated member to the back of each solar concentrator. U.S. Pat. No. 4,268,332 illustrates such a device wherein a metal tube aligned parallel with the focal line of the concentrator is incorporated within the back portion of the concentrator device itself. To provide appropriate torsional strength, the metal tube must be relatively large and heavy and thereby produces a disadvantage similar to that described above due to added weight and cost of the device.

Yet another consideration in evaluating torsional support structures for solar concentrators is the interconnection of the ends of the solar concentrators when two or more concentrators are aligned and joined for common rotational motion. In such arrangements, the concentrators are arranged in a row and joined together with the ends of the solar concentrators typically being joined utilizing stiff metal shafts. When considering torsional support, the metal shafts must have enough torsional stiffness to transfer any wind-induced twisting loads from one solar concentrator to the adjacent solar concentrator. High torsional stiffness of the metal shafting is generally obtained by increasing the diameter of the shafting, and to support the large metal shafting, large bearings are required. A disadvantage of this type of conventional construction for interconnecting solar concentrators is the high weight and cost of the metal shafting that connects adjacent solar concentrators as well as the high cost of the bearings that support the metal shafting. Thus, there is still a need for a support mechanism which provides high torsional stiffness in a solar concentrator as well as in a group of solar concentrators that are aligned in an array, which mechanism is both low in cost as well as low in weight.

SUMMARY OF THE INVENTION

Accordingly, it is one object of the present invention to provide a solar concentrating panel having an improved structural support mechanism.

It is another object of the present invention to provide an array of longitudinally aligned, commonly rotatable solar concentrating devices having improved torsional stiffness and support properties.

It is a further object of the present invention to provide a mechanism for enhancing the torsional stiffness and support of a solar concentrating device, which mechanism is high in efficiency, low in weight and low in cost.

To achieve the foregoing and other objects and in accordance with the purpose of the present invention, a solar concentrator device is disclosed. The device includes a solar concentrating panel having a longitudinal axis and defining a parabolic surface having a focal line substantially parallel to said longitudinal axis. The parabolic surface terminates in opposed longitudinal side edges. A mechanism is provided for rotating the panel about its longitudinal axis. Finally, an arrangement provides torsional support for the panel and includes a frame structure aligned obliquely to the longitudinal axis and extending between the opposed longitudinal side edges of the parabolic surface.

BRIEF DESCRIPTION OF THE DRAWINGS

The accompanying drawings, which are incorporated in and form a part of the specification, illustrate preferred embodiments of the present invention, and together with the description, serve to explain the principles of the invention. In the drawings:

FIG. 5 is an exploded, partial perspective view of the joint structure interconnecting aligned panel components of the embodiment illustrated in FIG. 4.

DETAILED DESCRIPTION OF THE PREFERRED EMBODIMENTS

Figure 1:
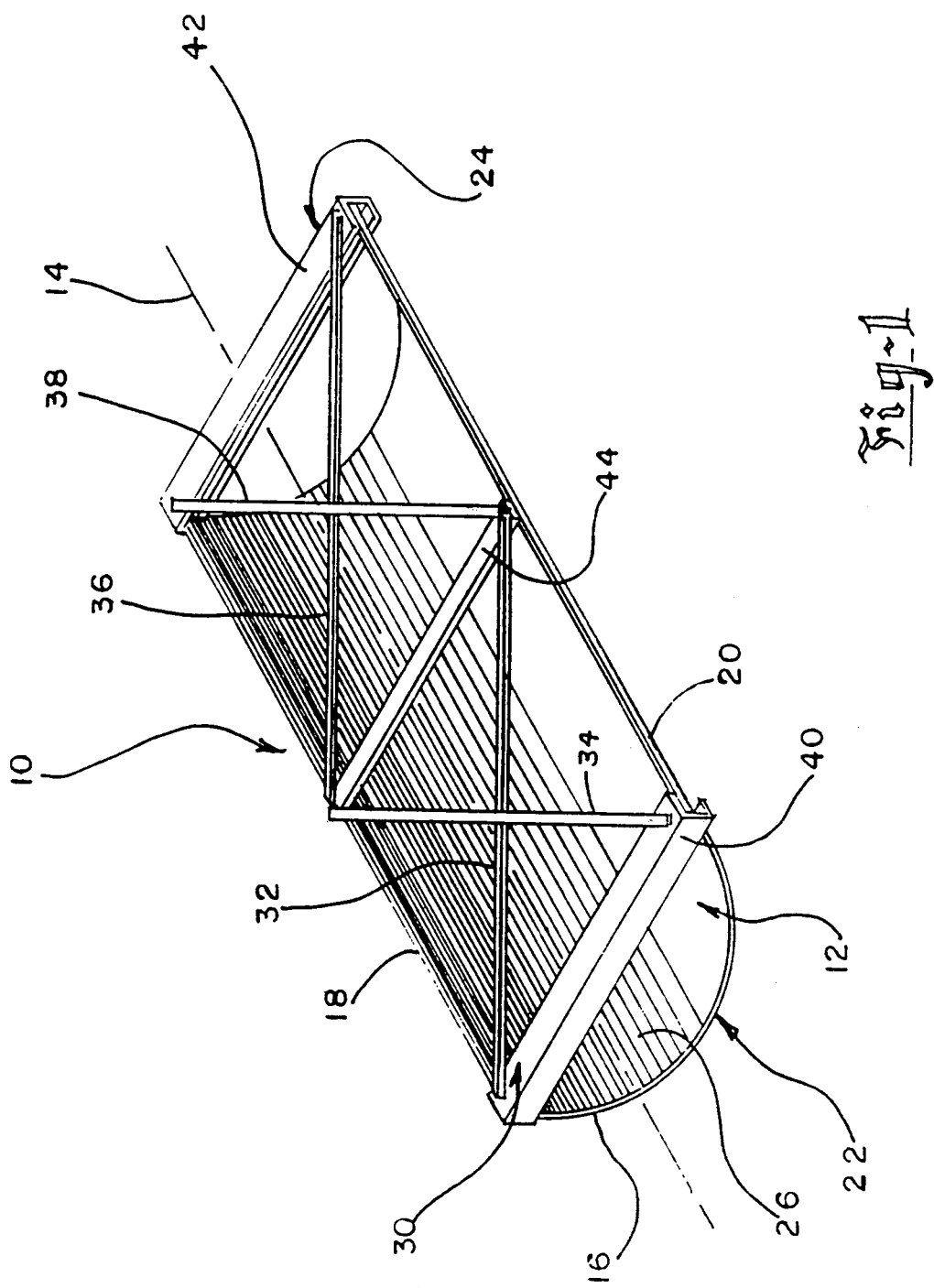
FIG. 1 is a front perspective schematic of a parabolic trough solar concentrator device constructed in accordance with the present invention.

Referring first to FIG. 1, a solar concentrator 10 is illustrated. The solar concentrator 10 is sized and shaped to receive incident sun light rays and reflect and concentrate them onto a solar collection system. In the preferred illustrated embodiment, the concentrator 10 includes an elongated, trough-shaped reflective panel 12 for concentrating incident solar radiation. The panel 12 is elongated along a longitudinal axis 14 and includes a generally rectangular top plan view and a parabolic cross section 16. The parabolic panel 12 terminates along a pair of opposed, substantially parallel longitudinal side edges 18, 20 and end portions 22, 24. The reflective panel 12 preferably includes an inner parabolic surface 26 that is constructed from a highly reflected material such as polished metal, a silvered metal/glass, a silvered glass/glass laminate, or metal covered with a metalized plastic reflective film. Such highly reflective materials for solar concentrator surfaces are well known in the art, and any such material may be effectively utilized with the present invention.

One particular problem with such elongated concentrator devices is that they must have sufficient torsional stiffness to withstand wind-induced twisting loads. Otherwise, the devices will twist along their longitudinal axis 14 which will degrade the optical performance of the concentrators as well as permanently deform them. The present invention utilizes a support framework or grid 30 to provide torsional stiffness to the device 10. The support frame 30 preferably includes at least one pair of support braces 32, 34 which are aligned obliquely relative to the longitudinal axis 14 and extend between the longitudinal side edges 18, 20 of the parabolic panel 12. In the illustrated embodiment of FIG. 1, two pairs of such braces are disclosed and include the first pair 32, 34 and a second pair 36, 38. The brace members 32, 34 and 36, 38 of each pair of members preferably cross each other and may be secured to each other at the point where they cross.

The frame 30 also preferably includes a pair of end mounting brackets 40, 42 and a central bracket 44 which is disposed approximately midway between the end mounting brackets 40, 42. The brackets 40, 42, 44 are all secured between the longitudinal side edges 18, 20 of the panel 12 and are aligned substantially perpendicular to the longitudinal axis 14. All of the members of the frame 30, including the diagonal braces 32-38 and the perpendicular brackets 40-44 are all constructed from a suitable structural material, such as aluminum, steel and the like. In addition, all of the transverse members 32, 34 and 36, 38 are preferably secured by welding or the like to lateral end portions of the support brackets 40, 42, 44 proximate either longitudinal side edge 18, 20.

Thus, for example, the brace 32 is secured to the end of the end mounting bracket 40 proximate the longitudinal side edge 18 and extends transversely across the face of the panel 12 to the opposite end portion of the central bracket 44 proximate the side edge 20. Likewise, the paired brace member 34 extends from the end portion of the mounting bracket 40 proximate the lateral side edge 20 diagonally across the panel 12 to the end portion of the central bracket 44 proximate the side edge 18. The other pair of braces 36, 38 are likewise secured to the central bracket 44 and the end mounting bracket 42. In this manner, the paired braces 32, 34 and 36, 38 in conjunction with the brackets 40, 42, 44 provide high torsional stiffness to the solar concentrator device 10 and allow the device 10 to resist the twisting loads that are imposed thereon by high winds. The two outer or end mounting brackets 40, 42 are also utilized to support the end portions 22, 24 of the device 10. The brackets 40-44 are preferably secured to the panel 12 by welding, bolting or any other suitable attachment mechanism.

While the frame 30 spans the face or front of the solar concentrator device 10 and thereby blocks a small portion of the incident solar radiation before it can be reflected by the concentrator surface 26, the optical loss resulting from the construction of the present invention is very small. Moreover, the optical loss from such a construction is relatively insignificant compared to the large weight and cost reductions that result by use of the frame construction 30 of the present invention. Moreover, the brace members 32, 34 and 36, 38 are preferably in the form of flat bars, although any shaped form may be utilized. The central bracket 44 is also preferably in the form of a flat bar, while the end brackets 40 and 42 are preferably in the form of channel shaped members having a flat bar portion which corresponds to the flat bar shape of the central bracket 44. Further details of the end brackets 40, 42 are discussed below.

Figure 2:
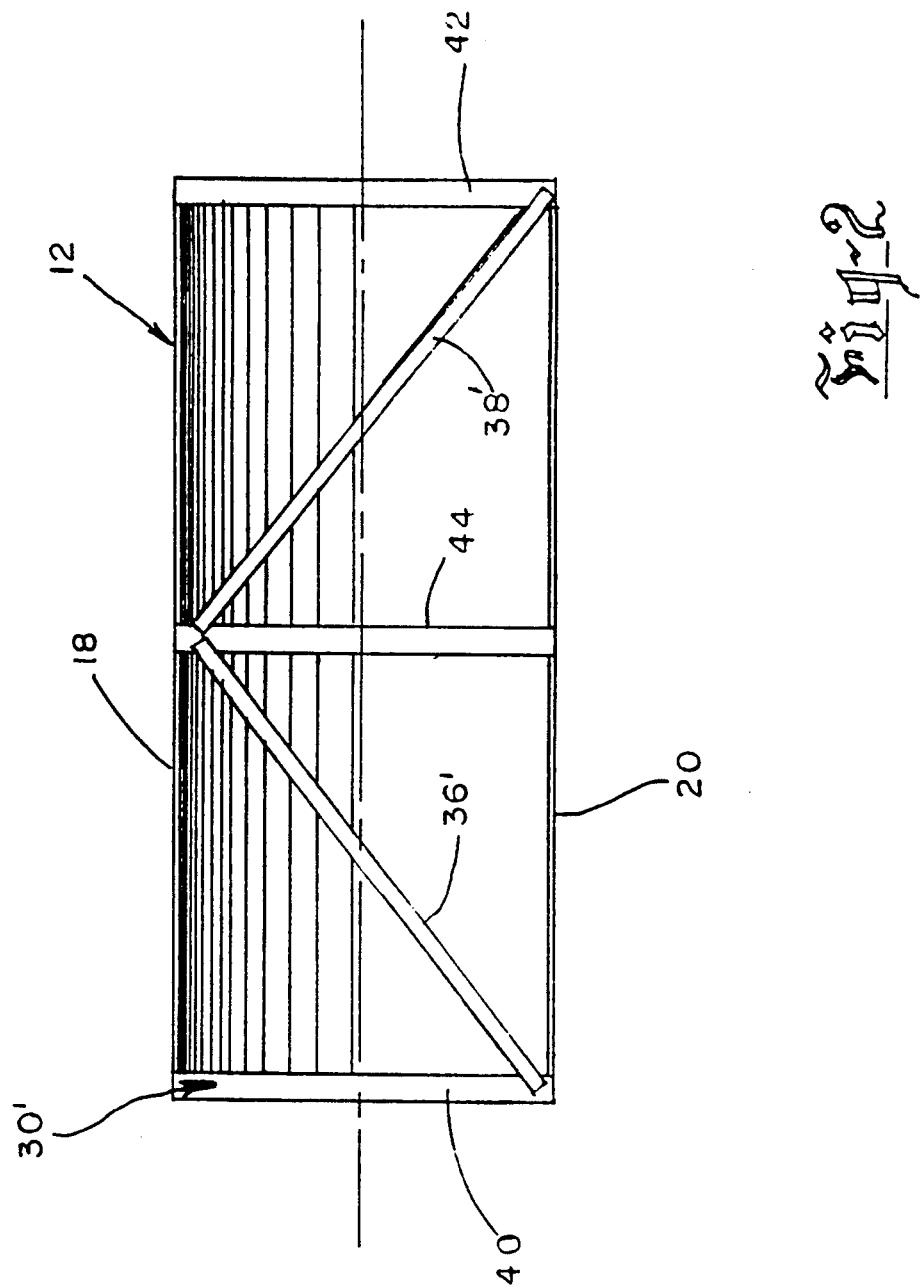
FIG. 2 is a top plan view of an alternate embodiment of FIG. 1.
Figure 3:
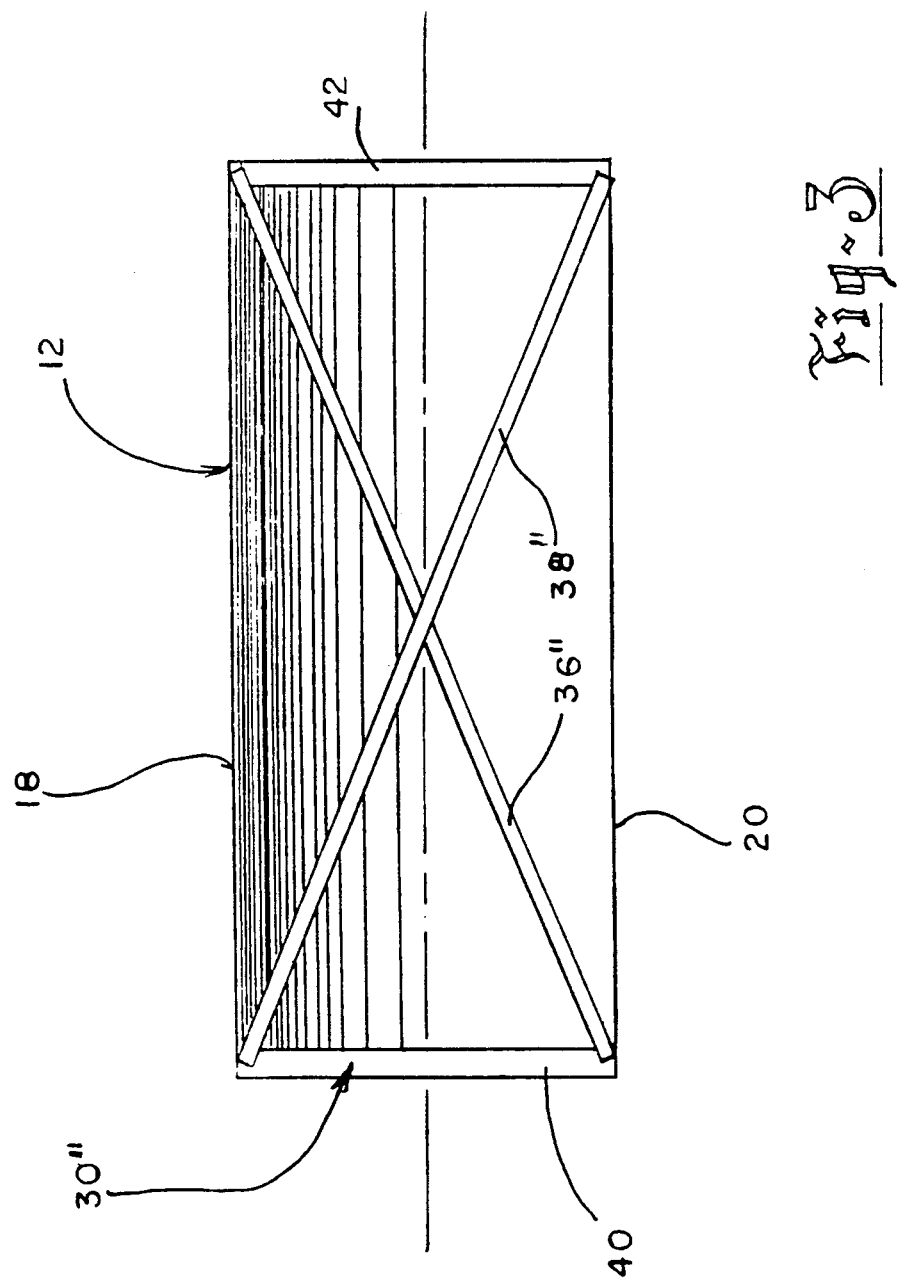
FIG. 3 is a top plan view similar to that of FIG. 2 but illustrating yet another embodiment of the invention.

Referring to FIGS. 1-3, the frame or grid 30 of the present invention may be embodied in several different arrangements. The arrangement as illustrated in FIG. 1 and discussed above discloses the use of two pairs of diagonal members 32, 34 and 36, 38. Referring to FIG. 2, a second embodiment of the frame 30' is illustrated. In this instance, the frame 30' includes the end mounting brackets 40, 42 and the central bracket 44 secured to the panel 12 at longitudinal side edges 18, 20 as in the prior embodiment. In this instance, however, only one pair of diagonal or transverse braces 36' and 38' are utilized. In this particular embodiment, the brace 36' is secured to one end of the end bracket 40 proximate the longitudinal side edge 20 and extends across the face of the panel 12 to its attachment point at the opposite end of the central bracket 44 proximate the longitudinal side edge 18. The paired brace 38' is also secured to the same end portion of the central bracket 44 as the brace 36' and extends diagonally across the face of the panel 12 for attachment to the opposite end portion of the end mounting bracket 42 proximate the longitudinal side edge 20.

A third embodiment of the present invention is illustrated in FIG. 3 and includes the frame 30" having end brackets 40, 42 as in the prior embodiments extending substantially perpendicularly across the face of the panel 12 between its longitudinal side edges 18, 20. In this particular embodiment, the central bracket 44 is eliminated, and the single pair of braces 36", 38" extend across the entire face of the panel 12 between the end mounting brackets 40, 42. In this instance, the brace 36" extends from the end of the mounting bracket 40 proximate the longitudinal side edge 20 diagonally across the device 12 to the opposite end of the mounting bracket 42 proximate the longitudinal side edge 18. Likewise, the paired brace 38" extends in the opposite direction from the end of the mounting bracket 40 proximate the side edge 18 across to the opposite end of the bracket 42 proximate the side edge 20. In this instance, the braces 36", 38" may be secured to each other at the point where they cross. The embodiments of FIGS. 1-3 all provide high torsional stiffness to the parabolic trough solar concentrator device 10. A common characteristic of all the frames 30, 30', 30" of the various illustrated embodiments is the inclusion of at least one structural member in the frame that is positioned diagonally or at a skewed angle with respect to the longitudinal side edges 18, 20 of the solar concentrator panel 12. It is this diagonal characteristic which provides the torsional stiffness to the device 10.

Figure 4:
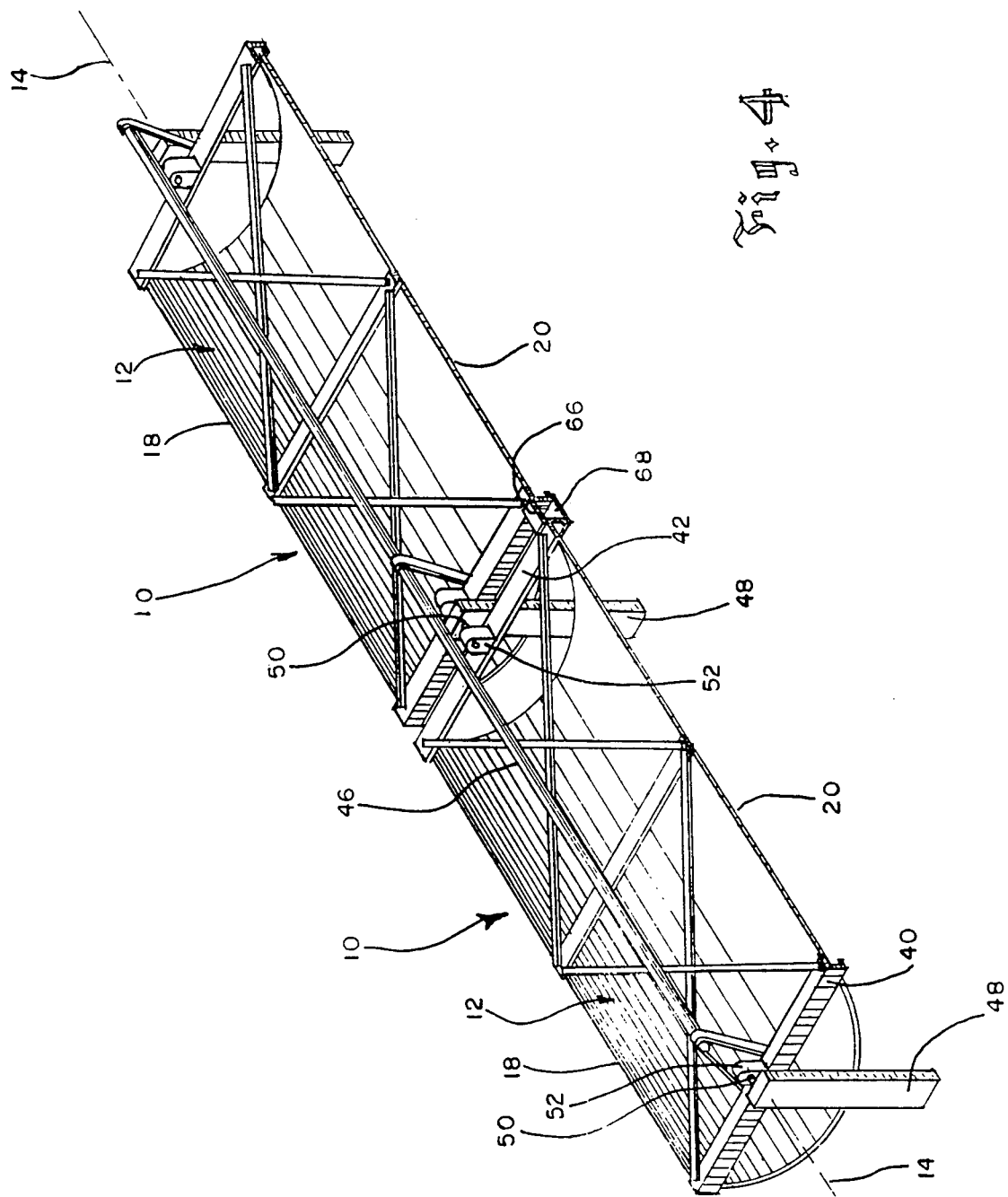
FIG. 4 is a front perspective schematic of an array of solar concentrator devices interconnected for uniform rotation and constructed in accordance with the present invention.

Referring now to FIGS. 4 and 5, a pair of solar concentrators 10 are provided and are preferably constructed in accordance with the embodiment illustrated in FIG. 1. The two concentrator devices 10 are aligned along a common longitudinal axis 14 and are configured so that they rotate together about the same axis of rotation. Any suitable mechanism for rotating the array of solar concentrators 10 may be provided, and since such mechanisms are well known in the art and are illustrated by some of the aforementioned prior art patents, such rotation mechanisms are not specifically illustrated herein. A collection tube or solar energy convertor device 46 is provided and is disposed along the focal line of the solar concentrators 10 to intercept and absorb the solar radiation that is concentrated by the reflective panels 12 of the devices 10. Suitable working fluids, such as water, oil and the like, may be pumped through the collection tube 46 to collect the concentrated solar energy in the form of heat. Any appropriate and suitable mechanism for pumping the working fluid through the collection tube 46 may be utilized with the present invention, and since such mechanisms are well known in the art, they are therefore not illustrated herein. Each solar concentrator device 10 is supported by a pair of support pilons 48 located at the end portions 22, 24 of the device 10. As illustrated in FIG. 4, a single support pilon 48 may be utilized for two adjacent devices 10. A shaft 50 connects each outer bracket 40, 42 to its adjacent support pilon 48 by being journalled in a support bearing 52 mounted thereon. This allows the solar concentrators 10 to rotate. The shaft 50 is secured to its support pilon 48 in each instance by welding or any other suitable attachment mechanism. The shaft 50 may be small in diameter because it does not transmit twisting loads from one solar concentrator 10 to the adjacent solar concentrator 10. The shaft 50 serves only to support the solar concentrators 10 and to provide a pivot point for rotation.

Referring in particular to FIG. 5, each end mounting bracket 40, 42 is preferably in the form of a channel member. In the illustrated embodiment, the end mounting bracket 42 includes leg portions 54, 56 interconnected by an intermediate member 58. Likewise, the end mounting bracket 40 includes leg portions 60, 62 interconnected by an intermediate portion 64. The top leg portions 54, 60 of the end brackets 42, 40 are secured to the panels 12, while the intermediate portions 58, 64 depend downwardly therefrom. To attach adjacent panels 12 to each other, a first connecting bar 66 interconnects the upper leg portions 54, 60 of adjacent mounting brackets 42, 40, while a second connecting bar member 68 interconnects the lower leg portions 56, 62 of the adjacent mounting brackets 42, 40. The spaced, connecting bar members 66, 68 may be in any form and are preferably welded, bolted or otherwise attached to the end mounting brackets 42, 40. In preferred form, the bar members 66, 68 are separated by a distance substantially greater than their own thickness. This attachment mechanism occurs only along the one longitudinal side edge 20 of the adjacent panels 12 and does not occur along the longitudinal side edges 18 thereof. In this manner, the longitudinal side edges 18 of the adjacent panels 12 are not interconnected and are in fact spaced from each other. This permits the array of devices 10 to be rotated simultaneously without restriction in the amount of rotation achievable by the array of concentrators 10 as the longitudinal side edges 18 are rotated underneath the rotational axis and passed by the support pilons 48. The two parallel connecting bar members 66, 68 provide a very simple but rigid means of connecting adjacent solar concentrators 10 while maintaining a high torsional stiffness along the array of solar concentrators 10.

As can be seen from the above, the present invention provides a simple yet effective mechanism for providing torsional stiffness and support to parabolic solar concentrators, particularly those in the form of an array. The support structure of the present invention is light weight and low in cost, and is also relatively easy to secure to any existing parabolic concentrator arrangement. While the arrangement of the present invention is low in cost and light weight, it is nonetheless effective in preventing torsional deformation of an array of linked parabolic solar concentrator and thereby prevent excessive twisting and deformation thereof.

It will be understood that the present invention may be embodied in other specific forms without departing from the spirit or central characteristics thereof. The present examples and embodiments, therefore, are to be considered in all respects as illustrative and not restrictive, and the present invention is not to be limited to the details particularly given herein, but may be modified within the scope of the appended claims except as precluded by the prior art.

We claim:
1. Solar concentrator device, comprising:
   a solar concentrating panel having a longitudinal axis and defining a parabolic surface having a focal line substantially parallel to said longitudinal axis, said surface terminating in opposed longitudinal side edges;

means for rotating said panel about said axis; and frame means for providing rigid torsional support for said panel including at least one pair of crossed, rigid structural support braces, each said brace extending obliquely relative to said longitudinal axis between opposed longitudinal side edges of said parabolic surface.

2. The device as claimed in claim 1, wherein the braces of each said pair of braces are secured to each other at the point where they cross.

3. The device as claimed in claim 1, wherein said frame means further comprises a central support bracket aligned substantially perpendicular to said longitudinal axis and positioned to interconnect said opposed longitudinal edges intermediate the axial length of said panel, and a mounting bracket disposed at each longitudinal end portion of said panel aligned substantially perpendicular to the longitudinal axis of said panel with one pair of said support braces being disposed between said central bracket and each of said end mounting brackets.

4. The device as claimed in claim 1, wherein said parabolic surface comprises a highly reflective material capable of reflecting and concentrating solar energy.

5. The device as claimed in claim 4, wherein said highly reflective material is selected from the group consisting of polished metal, silvered glass, and metalized plastic film.

6. The device as claimed in claim 1, wherein said device further comprises means for collecting concentrated solar energy disposed along said focal line of said parabolic surface.

7. In a solar energy concentrating apparatus having a plurality of elongated, interconnected solar concentrating panels aligned along a common longitudinal axis, each said panel being in the form of a parabolic trough having two end portions, opposed longitudinal edges extending between said end portions, a focal line substantially parallel to said longitudinal axis, and means for rotating said aligned, interconnected panels about a common axis of rotation, the improvement comprising means for providing rigid, torsional stiffness and support for each said panel including fixed, rigid frame means aligned obliquely to said longitudinal axis and extending between said opposed longitudinal edges of each said parabolic trough, said frame means comprising end mounting brackets aligned substantially perpendicular to said longitudinal axis and disposed at end portions of each said panel between said opposed longitudinal edges, and at least one pair of rigid, structural support braces each extending obliquely relative to said longitudinal axis between opposed longitudinal edges of said panel, said improvement further comprising single interconnecting means for interconnecting the adjacent end mounting brackets of adjacent panels proximate a single pair of adjacent longitudinal panel side edges, said rotating means driving said interconnected panels through said single interconnecting means.

8. The improvement of claim 7, wherein at least one end of each said support brace is fastened to a mounting bracket proximate one said longitudinal edge.

9. The improvement of claim 7, wherein the braces of said pair of support braces are aligned transversely to each other and fastened at each end to one said end mounting bracket proximate said longitudinal trough edge.

10. The improvement of claim 7, wherein said frame means further comprises a central support bracket mounted between said opposed longitudinal edges substantially perpendicular to said longitudinal axis and substantially intermediate the length of said panel, each said support brace extending between one end of said central bracket and the opposite end of one end mounting bracket.

11. The improvement of claim 10, wherein said frame means comprises one said pair of braces, with one brace of said pair of braces extending from said central bracket proximate one longitudinal edge of said panel to one said end bracket proximate the opposite longitudinal panel edge, and the other said brace extending from said central bracket proximate one longitudinal edge to the opposite end bracket proximate the opposite longitudinal panel edge.

12. The improvement of claim 11, wherein said braces of said pair of braces are secured to the same end of said central bracket.

13. The improvement of claim 11, wherein the braces of said pair of braces are secured to opposite ends of said central bracket.

14. The improvement of claim 10, wherein said frame means comprises two said pair of braces, with the braces of each said pair of braces being aligned transversely to each other and interconnected with the ends of said central bracket to opposite ends of one end mounting bracket, one pair of said braces interconnecting said central bracket with one said end bracket and the other said pair of braces interconnecting said central bracket with the opposite end mounting bracket.

15. The improvement of claim 7, wherein said interconnecting means comprises a pair of spaced connecting bar members fastened to each of said adjacent end mounting brackets along one longitudinal panel edge, the opposite longitudinal panel edge being free of interconnection between said oppositely disposed mounting brackets of adjacent panels.

16. The improvement of claim 15, wherein each end mounting bracket comprises a channel member having spaced, parallel leg portions, with each said leg portion being secured to one said connecting bar member.

17. The improvement of claim 7, wherein said panel rotating means further comprises support means disposed at each end of each said panel to align said panels and permit said panels to rotate together when any one of said panels is rotated about said common axis of rotation.

18. The improvement of claim 7, wherein said apparatus further includes energy collection means disposed along said focal line.

19. Apparatus for providing torsional stiffness and support to an array of longitudinally aligned, simultaneously rotatable solar concentrating panels each defining a parabolic reflecting surface having longitudinally spaced end portions and substantially parallel, opposed side edges aligned parallel to the longitudinal axis of said panel, said apparatus comprising:

a structural grid for each said panel including at least one pair of rigid support braces aligned diagonally relative to the longitudinal axis of said panel and joining the opposed side edges of said parabolic surface of said panel, and end brackets aligned substantially perpendicular to said longitudinal axis and interconnecting said opposed side edges at each end portion of said panel;

means for connecting the opposed end brackets of adjacent panels proximate one common longitudinal side edge of said panels leaving the opposite longitudinal side edges of said panels free from connection to adjacent panels; and rotating means for simultaneously driving said array of interconnected panels through said connecting means.

20. The apparatus as claimed in claim 19, wherein said grid further comprises a central support bracket joining the opposed longitudinal side edges of each said panel intermediate the end portions of said panel and being aligned substantially perpendicular to said longitudinal axis.

21. The apparatus as claimed in claim 20, wherein said support members comprise one pair of support braces with one said support brace being disposed on either side of said central bracket.

22. The apparatus as claimed in claim 20, wherein said support members comprise two pair of support braces with said pairs of braces being disposed one on either side of said central bracket.

23. The apparatus as claimed in claim 22, wherein the support braces of each said pair braces are crossed and interconnect the central bracket with one said end bracket.

24. The apparatus as claimed in claim 19, wherein said connecting means comprise a pair of spaced connecting arm members sandwiching the end brackets of adjacent panels spanning the distance between said adjacent panels, said connecting arm members being separated by a distance substantially greater than the thickness thereof.

* * * * *